(12) United States Patent
Zhang et al.

(10) Patent No.: US 8,774,296 B2
(45) Date of Patent: Jul. 8, 2014

(54) APPARATUS AND METHOD OF CALCULATING CHANNEL FREQUENCY DOMAIN CORRELATION

(75) Inventors: Lei Zhang, Beijing (CN); Xin Wang, Beijing (CN)

(73) Assignee: Fujitsu Limited, Kawasaki (JP)

( * ) Notice: Subject to any disclaimer, the term of this patent is extended or adjusted under 35 U.S.C. 154(b) by 127 days.

(21) Appl. No.: 13/024,743

(22) Filed: Feb. 10, 2011

(65) Prior Publication Data

US 2011/0194633 A1 Aug. 11, 2011

(30) Foreign Application Priority Data

Feb. 11, 2010 (CN) .......................... 2010 1 0111787

(51) Int. Cl.
*H04K 1/10* (2006.01)

(52) U.S. Cl.
USPC ............ 375/260; 370/330; 370/335; 370/336

(58) Field of Classification Search
USPC .................. 375/260, 341, 347, 232, 267, 350
See application file for complete search history.

(56) References Cited

U.S. PATENT DOCUMENTS

| | | | |
|---|---|---|---|
| 7,027,429 B2 * | 4/2006 | Laroia et al. .................. | 370/350 |
| 7,894,543 B2 * | 2/2011 | Chang et al. .................. | 375/267 |
| 2006/0088112 A1 * | 4/2006 | Das et al. ....................... | 375/260 |
| 2006/0227904 A1 * | 10/2006 | Mueller-Weinfurtner et al. ............................. | 375/343 |
| 2007/0098090 A1 * | 5/2007 | Ma et al. ........................ | 375/260 |
| 2008/0062935 A1 * | 3/2008 | Nakagawa et al. ........... | 370/335 |
| 2008/0144752 A1 * | 6/2008 | Zhou et al. ..................... | 375/347 |
| 2008/0240265 A1 * | 10/2008 | Fechtel ......................... | 375/260 |
| 2009/0003489 A1 * | 1/2009 | Li et al. ......................... | 375/316 |
| 2009/0103666 A1 * | 4/2009 | Zhao et al. ..................... | 375/341 |
| 2009/0180558 A1 * | 7/2009 | Ma et al. ........................ | 375/260 |
| 2009/0296862 A1 * | 12/2009 | Nakaya ......................... | 375/343 |

(Continued)

OTHER PUBLICATIONS

OFDM Channel Estimation Based on Pilot, Xiaoying Zhang et al., 2003, Institute of Electronic and Engineering Modern Electronic Technology, Issue 21, pp. 85-88.*

(Continued)

*Primary Examiner* — Daniel Washburn
*Assistant Examiner* — Berhanu Tadese
(74) *Attorney, Agent, or Firm* — Katten Muchin Rosenman LLP (57) ABSTRACT

An apparatus and a method of calculating a channel frequency domain correlation are disclosed in the invention. The apparatus of calculating the channel frequency domain correlation includes: a pilot channel preliminary estimation unit configured to preliminarily estimate a frequency domain channel response at pilot subcarriers of a receiving signal to obtain a pilot channel preliminary estimation value; a determination unit configured to determine a channel frequency domain correlation value which can be reliably calculated; a first channel frequency domain correlation value calculation unit configured to calculate the channel frequency domain correlation value which can be reliably calculated using the pilot channel preliminary estimation value to obtain a reliably calculated channel frequency domain correlation value; and a second channel frequency domain correlation value calculation unit configured to calculate an other channel frequency domain correlation values using the reliably calculated channel frequency domain correlation value. The invention may also effectively apply to calculation of the channel frequency domain correlation and channel estimation.

12 Claims, 4 Drawing Sheets

(56) References Cited

U.S. PATENT DOCUMENTS

| | | | |
|---|---|---|---|
| 2009/0304116 A1* | 12/2009 | Challa et al. | 375/340 |
| 2010/0040154 A1* | 2/2010 | Carbonelli et al. | 375/260 |
| 2010/0040156 A1* | 2/2010 | Patel et al. | 375/260 |
| 2010/0040162 A1* | 2/2010 | Suehiro | 375/260 |
| 2010/0046661 A1* | 2/2010 | Yoshida et al. | 375/285 |
| 2010/0098031 A1* | 4/2010 | Charbit | 370/336 |
| 2010/0203841 A1* | 8/2010 | Hwang et al. | 455/67.14 |
| 2010/0272207 A1* | 10/2010 | Zangi et al. | 375/267 |
| 2010/0322357 A1* | 12/2010 | Krasny et al. | 375/341 |
| 2011/0007792 A1* | 1/2011 | Kimata | 375/232 |
| 2011/0013585 A1* | 1/2011 | Jitsukawa et al. | 370/330 |
| 2011/0194633 A1* | 8/2011 | Zhang et al. | 375/260 |
| 2011/0211630 A1* | 9/2011 | Nakahara et al. | 375/232 |
| 2011/0286499 A1* | 11/2011 | Panicker et al. | 375/148 |
| 2011/0310945 A1* | 12/2011 | Sato | 375/224 |
| 2012/0033561 A1* | 2/2012 | Kawamura et al. | 370/252 |

OTHER PUBLICATIONS

Simplified Method of Channel Estimation in MIMO-OFDM Systems, Gong Feng-kui et al., 2006, Article ID: 1671-5497(2006)06-0989-04, pp. 989-992.*

Chinese 1st Office Action dated Apr. 18, 2013, from corresponding Chinese Priority Patent Application No. 201010111787.0 with English-language translation.

Gong Feng-Kui, et al.; Simplified Method of Channel Estimation in MIMO-OFDM Systems; State Key Laboratory of ISN, Xidian University, Xian 710071, China; Journal of Jilin University; 1671-5497(2006) 06-0989-04; pp. 989-992; with English-language abstract.

Zhang Xiaoying, et al.; OFDM Channel Estimation Based on Pilot; Institute of Electronic and Engineering, National University of Defense Technology, Changsha, 410073, China; 2003, 21, 164; pp. 85-88; with English-language abstract.

Chinese Second Office Action dated Sep. 29, 2013, from corresponding Chinese Application No. 201010111787.0.

* cited by examiner

APPARATUS AND METHOD OF CALCULATING CHANNEL FREQUENCY DOMAIN CORRELATION

FIELD OF THE INVENTION

The present invention generally relates to wireless communication. Specifically, the present invention relates to an apparatus and a method of calculating channel frequency domain correlation, and a channel estimation method and an apparatus thereof.

BACKGROUND OF THE INVENTION

Being affected by surrounding buildings, objects, pedestrians, vehicles and the ground, etc, a wireless signal may suffer reflection, refraction, diffraction and dispersion, etc. Therefore, the wireless signal received by the receiving end generally has suffered severe fading and time delay spread. In order to recover the transmitted data, the receiver needs to estimate the wireless channel gone through by the signal and then to compensate for the loss suffered by the received signal. The module for estimating the channel is referred to as a channel estimation module, and the module for compensating for the received signal is referred to as an equalization module. The channel estimation module is essential to the wireless system. The better the performance of the channel estimation is, the better the bit error performance of the system will be, that is, the more data the system will correctly receive.

Orthogonal Frequency Division Multiplexing (OFDM) technology is a transmission technology newly developing in recent years. The OFDM system first performs IFFT (Inverse Fast Fourier Transform) transform to data to be transmitted at the transmitting end to transform it into a time signal which is subsequently transmitted in time domain. At the receiving end, the received signal first is transformed into frequency domain through FFT (Fast Fourier Transform), and then undergoes such operations as equalization, demodulation and decoding to restore the transmitted signal. Since a multipath channel with certain time delay extension gone through by the transmitted signal in time domain will be equivalently transformed to a flat fading channel, the OFDM system has great anti-fading capability, and has been widely used in recent years, for example, wireless communication systems such as Wimax (Worldwide Interoperability for Microwave Access) system and LTE (Long Term Evolution), and digital television broadcasting systems such as DMB-T (Digital Multimedia Broadcast-Terrestrial), CMMB (China Mobile Multimedia Broadcasting) and DVB (Digital Video Broadcasting).

Herein, the frequency domain data carried by the $k^{th}$ subcarrier in the $l^{th}$ OFDM symbol is $X_{k,l}$, and the frequency domain equivalent received signal $Y_{k,l}$, corresponding to the frequency domain data may be expressed as:

$$Y_{k,l} = H_{k,l} X_{k,l} + N_{k,l} \quad (1)$$

wherein, k and l are integrals, $H_{k,l}$ is the equivalent frequency domain flat fading channel gone through by $X_{k,l}$, $N_{k,l}$ is the frequency domain equivalent additive Gaussian white noise of which the average is zero and the variance is $\sigma_N^2$.

The channel estimation for the OFDM system is an estimation of the equivalent frequency domain channel response $H_{k,l}$. Minimum Mean Square Error (MMSE) criterion is a criterion minimizing the estimation error average. The channel estimation algorithm based on MMSE criterion is one of the optimal channel estimation algorithms. According to the MMSE channel estimation algorithm, the estimation value $\hat{H}_{k,l}$ of the channel frequency domain response at the $k^{th}$ subcarrier in the $l^{th}$ OFDM symbol may be calculated according to formula (2):

$$\hat{H}_{k,l} = w_{k,l}^H \hat{H}_{k,l}^P \quad (2)$$

In the above formula, the variable $\hat{H}_{k,l}$ is an estimation value of the channel frequency domain response at the subcarrier $(k,l)$, the vector $w_{k,l}$ is a filter coefficient of the MMSE channel estimator, the vector $\hat{H}_{k,l}^P$ is formed by arrangement of channel impulse response evaluation values of pre-selected pilot points for estimating the channel frequency domain response at the subcarrier $(k,l)$. Assuming that each data subcarrier performs the MMSE channel estimation using M observation points, M being an integral, and the serial number for the M observation points respectively being $(k_1, l_1)$, $(k_2, l_2)$, ..., $(k_M, l_M)$, then the vector $\hat{H}_{k,l}^P$ may be expressed as the following formula (3):

$$\hat{H}_{k,l}^P = [\hat{H}_{k_1,l_1} \ \hat{H}_{k_2,l_2} \ \ldots \ \hat{H}_{k_M,l_M}] \quad (3)$$

According to MMSE criterion, $w_{k,l}$ is a solution minimizing the function $J(w_{k,l})$, wherein the function $J(w_{k,l})$ is given by formula (4):

$$J(w_{k,l}) = E\{\|\hat{H}_{k,l} - H_{k,l}\|^2\} \quad (4)$$

Wherein, the function $E\{\ \}$ is used for calculating the mathematical expectation value.

According to the Orthogonal principle, $w_{k,l}$ may be calculated through the following formula (5).

$$w_{k,l} = \theta_{k,l}^T \Phi_{k,l}^{-1} \quad (5)$$

Wherein, $\theta_{k,l}$ is a cross-correlation vector for the frequency domain channel response at the subcarrier $(k,l)$ and the M observation points received value, which can be expressed as:

$$\theta_{k,l} = [\theta_{k-k_1,l-l_1} \ \theta_{k-k_2,l-l_2} \ \ldots \ \theta_{k-k_M,l-l_M}]^T \quad (6)$$

The correlation value $\theta_{k-k_m,l-l_m}$, M=1, 2, ..., M in formula (6) may be expressed as follows:

$$\theta_{k-k_m,l-l_m} = E\{H_{k,l} \hat{H}^*_{k_m,l_m}\} \quad (7)$$

In formula (5), matrix $\Phi_{k,l}$ is a self-correlation matrix of the M observation points received value, which may be expressed as follows:

$$\Phi_{k,l} = \begin{bmatrix} \Phi_{k_1-k_1,l_1-l_1} & \Phi_{k_2-k_1,l_2-l_1} & \cdots & \Phi_{k_M-k_1,l_M-l_1} \\ \Phi_{k_1-k_2,l_1-l_2} & \Phi_{k_2-k_2,l_2-l_2} & & \Phi_{k_M-k_2,l_M-l_2} \\ \vdots & & \ddots & \\ \Phi_{k_1-k_M,l_1-l_M} & \Phi_{k_2-k_M,l_2-l_M} & \cdots & \Phi_{k_M-k_M,l_M-l_M} \end{bmatrix} \quad (8)$$

Wherein, the self-correlation value $\Phi_{k_m-k_{m'},l_m-l_{m'}}$, $\forall m',m=1, 2, \ldots, M$ may be expressed as follows:

$$\Phi_{k_m-k_{m'},l_m-l_{m'}} = E\{\hat{H}_{k_m,l_m} \cdot \hat{H}^*_{k_{m'},l_{m'}}\} \quad (9)$$

The correlation value given by formula (7) and (9) includes both time domain correlation and frequency domain correlation. Generally, it may be considered that the time domain correlation and the frequency domain correlation in the correlation values are independent from each other, therefore formula (7) and (9) may respectively be expressed as a product of the time domain correlation value and the frequency domain correlation value, as shown by following formula (10) and (11).

$$\theta_{k-k_m,l-l_m} = \theta_{\Delta f}(k-k_m) \cdot \theta_{\Delta t}(l-l_m) \quad (10)$$

-continued $$\theta_{k_m-k_{m'},l_m-l_{m'}} = \frac{N_0 \delta(k_m - k_{m'}, l_m - l_{m'})}{E_s(k_m, l_m)} + \theta_{\Delta f}(k_m, k_{m'}) \cdot \theta_{\Delta t}(l_m - l_{m'}) \quad (11)$$

Wherein, $N_0$ is a single side band power spectral density, $N_0=2\sigma_N^2$, $E_s(k_m,l_m)$ is the energy of the transmitted signal carried by the subcarrier $(k_m,l_m)$. The function $\delta(k_m-k_{m'},l_m-l_{m'})$ is expressed as follows.

$$\delta(k_m - k_{m'}, l_m - l_{m'}) = \begin{cases} 1 & \text{if } k_m = k_{m'} \text{ and } l_m = l_{m'} \\ 0 & \text{others} \end{cases} \quad (12)$$

It can be seen from the above analysis that the already known time domain correlation value $\theta_{\Delta t}(l-l_m)$ and the frequency domain correlation value $\theta_{\Delta f}(k-k_m)$ are the premise for a smooth implementation of the MMSE channel estimation algorithm.

Wherein, the time domain correlation $\theta_{\Delta t}(l-l_m)$ is correlated with a relative moving speed of the transmitting end and the receiving end and the type of Doppler fading experienced by the channel. For example, when the Doppler power spectral of the channel is the most common Clarke model (also referred to as Jakes model), the time domain correlation value $\theta_{\Delta t}(l-l_m)$ may be expressed as follows:

$$\theta_{\Delta t}(l-l_m) = J_0(2\pi f_d T_s(l-l_m)) \quad (13)$$

Wherein, function $J_0$ is the first kind of zero order Bessel function, $T_s$ is the baseband sample period of the system, $f_d$ is a single base band maximum Doppler frequency, which is correlated with the relative moving speed of the transmitting end and the receiving end, and can be calculated through the following formula (14):

$$f_d = \frac{F_G \cdot v}{c} \quad (14)$$

In formula (14), $F_G$ is a carrier frequency, v is a moving speed of the receiving end relative to the transmitting end, c is the light speed. In other words, under the premise that the type of channel Doppler is known, as long as the moving speed of the receiving end relative to the transmitting end is estimated and obtained, the time domain correlation characteristic of the channel may be obtained.

However, compared to the calculating process for the time domain correlation, the calculating process for the frequency domain correlation characteristic of the channel is more complicated. This is because the frequency domain correlation characteristic of the channel is related with the path number of the time multipath channel through which the signal is transmitted, power of each path and a time delay. The algorithm for calculating frequency domain correlation is generally divided into two categories: one is to estimate the time multipath channel through which the signal is transmitted, the other is to take statistics on the frequency domain received pilot signal based on the definition of channel frequency domain correlation, to obtain the estimation value of the channel frequency domain correlation.

In recent communication systems applying OFDM principle, the pilot usable for channel estimation may be limited, such as TD-LTE system with UE-Specific Reference Signal. In such a case, a small piece of time-frequency transmission resource used by certain receiver may have been transmitted through a channel different from time-frequency transmission resources around it. That is, the receiver faces two serious problems: firstly, it is impossible for it to observer how the multipath channel experienced by it is distributed in the whole frequency band; secondly, the number of the pilot usable by it is very limited. The first problem makes the receiver unable to estimate the time domain multipath channel through which the received signal is transmitted. The second problem makes the receiver unable to accurately estimate the channel frequency domain correlation coefficient required by all MMSE channel estimation using frequency receiving pilot.

SUMMARY OF THE INVENTION

In view of the above, a solution for calculating the channel correlation is proposed according to the invention. The solution makes it possible to use MMSE channel estimation in the above pilot limited system.

According to the first aspect of the invention, an apparatus of calculating channel frequency domain correlation is provided, which includes: a pilot channel preliminary estimation unit configured to preliminarily estimate a frequency domain channel response at pilot subcarriers of a receiving signal to obtain a pilot channel preliminary estimation value; a determination unit configured to determine a channel frequency domain correlation value which can be reliably calculated; a first channel frequency domain correlation value calculation unit configured to calculate the channel frequency domain correlation value which can be reliably calculated using the pilot channel preliminary estimation value to obtain a reliably calculated channel frequency domain correlation value; and a second channel frequency domain correlation value calculation unit configured to calculate an other channel frequency domain correlation values using the reliably calculated channel frequency domain correlation value.

According to the second aspect of the invention, a method of calculating channel frequency domain correlation is provided, including the steps of: estimating preliminarily a frequency domain channel response at pilot subcarriers of a receiving signal to obtain a pilot channel preliminary estimation value; determining a channel frequency domain correlation value which can be reliably calculated; calculating the channel frequency domain correlation value which can be reliably calculated using the pilot channel preliminary estimation value to obtain a reliably calculated channel frequency domain correlation value; and calculating the other channel frequency domain correlation value using the reliably calculated channel frequency domain correlation value.

According to the third aspect of the invention, a channel estimation apparatus is provided, including: the apparatus of calculating channel frequency domain correlation according to the first aspect of the invention; a minimum square error filter determination unit, configured to calculate and obtain a minimum square error filter coefficient based on the channel frequency domain correlation value calculated by the apparatus of calculating channel frequency domain correlation, in order to determine a minimum square error filter; a data channel estimation unit, configured to estimate a frequency domain channel response at the data subcarrier of the receiving signal based on the minimum square error filter.

According to the fourth aspect of the invention, a channel estimation method is provided, including: calculating a channel frequency domain correlation value using the method of calculating channel frequency domain correlation according to the second aspect of the invention; calculating and obtaining an MMSE filter coefficient using the channel frequency domain correlation value, to determine an MMSE filter; and estimating a frequency domain channel response at the data subcarrier of the receiving signal based on the MMSE filter.

According to other embodiments of the invention, a corresponding computer readable storage medium and a computer program product are also provided.

According to the embodiment of the invention, computation of the channel frequency domain correlation and channel estimation may be effectively performed.

These and other advantages of the invention will be more obvious by the following detailed description of the preferred embodiment of the invention in connection with the accompanying drawings.

BRIEF DESCRIPTION OF THE DRAWINGS

With reference to the following description of the embodiment of the invention in connection with the accompanying drawings, the above and other objectives, features and advantages of the invention will be more easily understood. Components in the accompanying drawing are only for illustration of the principle of the invention. In the accompanying drawings, the same or similar technical features or components are denoted with same or similar reference numbers. In the drawings.

DETAILED DESCRIPTION OF THE INVENTION

In the following the illustrative embodiment of the invention will be described with reference to accompanying drawings. For clearance and simplicity, not all features of the actual embodiments are described in the description. However, it should be understood, that many decisions specific to the embodiment must be made in a process of developing any such actual embodiments, in order to implement the specific objective of the developer, for example, conforming to those constraints related with the system and the services, which may vary according to different embodiment. Further, it should also be understood that although developing work may be very complicated and time-consuming, but for those skilled in the art benefiting from the disclosure, such developing work is merely a routine task.

Herein, it should also be noticed that in order to avoid obscuring the invention due to unnecessary details, only device structure and/or process steps closely related with the solution of the invention are described in the drawings and description, while description and illustration for the components and processes not closely related with the invention or already known by those skilled in the art are omitted.

Figure 1:
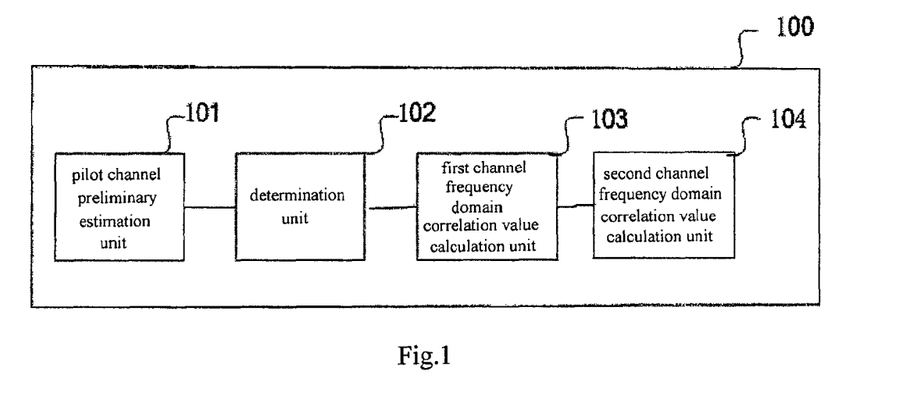
FIG. 1 illustrates a block diagram of an apparatus of calculating channel frequency domain correlation according to an embodiment of the invention.

FIG. 1 is a block diagram of the apparatus of calculating channel frequency domain correlation 100 according to an embodiment of the invention.

The apparatus of calculating channel frequency domain correlation 100 includes a pilot channel preliminary estimation unit 101, configured to preliminarily estimate the frequency domain channel response at a pilot subcarrier of a receiving signal to obtain a pilot channel preliminary estimation value; a determination unit 102, configured to determine a channel frequency domain correlation value which can be reliably calculated; a first channel frequency domain correlation value calculation unit 103, configured to calculate the channel frequency domain correlation value which can be reliably calculated using the pilot channel preliminary estimation value to obtain a reliably calculated channel frequency domain correlation value; and a second channel frequency domain correlation value calculation unit 104, configured to calculate other channel frequency domain correlation value using the reliably calculated channel frequency domain correlation value.

In one example, the pilot channel preliminary estimation unit 101 may perform LS (Least Square) channel estimation on the frequency domain channel response at the pilot subcarrier. Specifically, assuming that the subcarrier at which the pilot is (k, l), its LS channel estimation result may be expressed as follows:

$$H_{k,l}^{LS} = \frac{Y_{k,l}}{X_{k,l}} \tag{15}$$

Wherein, $Y_{k,l}$ is a received value of the pilot $X_{k,l}$. LS channel estimation is well known for those skilled in the art, and will not be described in detail. Those skilled in the art may also adopt other estimation method to preliminarily estimate the pilot channel.

In one example, the determination unit 102 may determine a number of sample which can be used to calculate the channel frequency domain correlation value according to a distribution of the pilot subcarrier, and determine the channel frequency domain correlation value which can be reliably calculated based on the number of sample. That is, the determination unit 102 analyses the receiving pilot and determines which channel frequency domain correlation value (or referred to as channel frequency domain correlation coefficient) can be reliably calculated based on the existing pilot resources.

In the following the operation of the determination unit 102 will be described, with the case in which the receiving resources are limited to one RB (resource block) in the TD-LTE system as an example.

Figure 6:
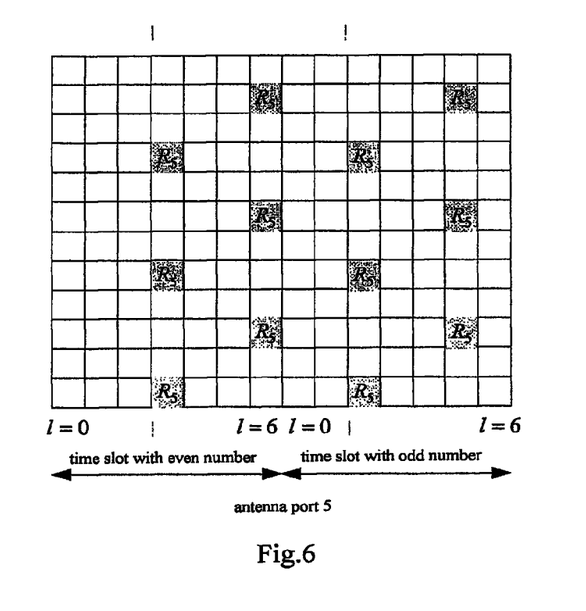
FIG. 6 illustrates a possible distribution map of a pilot subcarrier in a case that the receiving resources are limited to one RB (resource block) in TD-LTE system.

FIG. 6 illustrates a possible distribution map of the pilot subcarrier in a case that the receiving resources are limited to one RB in TD-LTE system. As shown in FIG. 6, only 12 pilot subcarrier points (shade portions) are available. In such case, limited by the position of the pilot, among all 11 channel frequency domain correlation values $\theta_{\Delta f}(1)$, $\theta_{\Delta f}(2)$, ..., $\theta_{66\ f}(11)$, it is unable to estimate directly such odd number channel frequency domain correlation value $\theta_{66\ f}(1)$, $\theta_{\Delta f}(3)$, ..., $\theta_{\Delta f}(11)$. Only the channel frequency domain correlation value at even number subcarrier internal may be obtained by estimation directly, because any two of the 12 pilot subcarrier points in FIG. 6 are separated by an even number in the frequency direction (vertical direction). The number of sample which can be used to calculate certain channel frequency domain correlation value may be determined according to a distribution of the pilot subcarrier. For example, there are 20 samples which can be used to estimate $\theta_{\Delta f}(2)$ (that is, there are totally 20 pairs that are separated by number of 2 in the frequency direction (vertical direction) among any two in the 12 pilot subcarrier points), and 16 samples to estimate $\theta_{\Delta f}(4)$, and 12 samples to estimate $\theta_{\Delta f}(6)$, and 8 samples to estimate $\theta_{\Delta f}(8)$, 4 samples to estimate $\theta_{\Delta f}(10)$.

The determination unit 102 may determine the channel frequency domain correlation value which can be reliably calculated based on the number of sample corresponding to each pilot subcarrier point. In one example, the channel frequency domain correlation value with the corresponding number of sample larger than or equal to a threshold is determined as the channel frequency domain correlation value which can be reliably calculated. For example, the threshold is set as 15, the channel frequency domain correlation value which can be reliably calculated is determined based on the number of sample. In such case, the estimation values of $\theta_{\Delta f}(2)$ and $\theta_{\Delta f}(4)$ are deemed as reliable, $\theta_{\Delta f}(6)$, $\theta_{\Delta f}(8)$ and $\theta_{\Delta f}(10)$ are deemed as unreliable. It is needless to say that the above threshold may be set as other values, such as 10. The above threshold may be preset. In another example, predetermined number of channel frequency domain correlation values with corresponding number of sample being comparatively large may be determined as the channel frequency domain correlation value which can be reliably calculated. For example, the predetermined number may be 2. In such case, the two channel frequency domain correlation value $\theta_{\Delta f}(2)$ and $\theta_{\Delta f}(4)$ with corresponding number of sample being comparatively high are determined as the channel frequency domain correlation value which can be reliably calculated.

In one example, the determination unit 102 may also determine all the channel frequency domain correlation value obtained by direct statistics as the channel frequency domain correlation value which can be reliably calculated.

In one example, in a case where the distribution map of the pilot subcarrier is known in advance, the determination unit 102 doesn't have to operate after the pilot channel preliminary estimation unit 101. Both of them may operate simultaneously or the determination unit 102 may operate before the pilot channel preliminary estimation unit 101.

In one example, the first channel frequency domain correlation calculation unit 103 may calculate the channel frequency domain correlation value which can be reliably computed according to the following formula (16):

$$\theta_{\Delta f}(q) = \underset{\{(k_1,l_1),(k_2,l_2)\} \in P_q}{E} \left\{ \frac{H_{k_1,l_1}^{LS} \cdot (H_{k_2,l_2}^{LS})^*}{\theta_{\Delta t}(l_2 - l_1)} \right\} \tag{16}$$

In the above formula, q is an integral, the set $P_q$ is a set consisting of all subscript pair $\{(k_1,l_1), (k_2,l_2)\}$ satisfying $k_2-k_1=q$, $H_{k_1,l_1}^{LS}$ is the pilot channel preliminary estimation value of the $k_1$th subcarrier in the $l_1$th orthogonal frequency division multiplex symbol as a pilot subcarrier, $H_{k_2,l_2}^{LS}$ is the pilot channel preliminary estimation value of the $k_2$th subcarrier in the $l_2$th orthogonal frequency division multiplex symbol as a pilot subcarrier, $\theta_{\Delta t}(l_2-l_1)$ is a time domain correlation value. $H_{k_1,l_1}^{LS}$ and $H_{k_2,l_2}^{LS}$ may be obtained by using LS channel estimation, but it is limited to this. The time domain correlation may be calculated according formula (13) and formula (14).

It should be noticed that formula (14) relates to a moving speed of the receiving end relative to the transmitting end. Those skilled in the art may estimate the moving speed using various methods, which will not be described in detail here. The module to estimate the moving speed may be incorporated in the first channel frequency domain correlation value calculation unit 103, or may also be a separate module in the apparatus of calculating channel frequency domain correlation 100, or may be outside the apparatus of calculating channel frequency domain correlation 100.

In one example, the second channel frequency domain correlation value calculation unit 104 may perform interpolation upon the reliably calculated channel frequency domain correlation value obtained by the first channel frequency domain correlation value calculation unit 103, to calculate other channel frequency domain correlation values that may be obtained directly by statistics. The specific interpolation method may be chosen among: polynomial interpolation (such as binomial interpolation, linear interpolation) and exponential interpolation, etc. Those skilled in the art may also choose to perform interpolation using other interpolation method. Taking the binomial interpolation and calculation of $\theta_{\Delta f}(6)$, $\theta_{\Delta f}(8)$ and $\theta_{\Delta f}(10)$ according to $\theta_{\Delta f}(2)$ and $\theta_{\Delta f}(4)$ as an example, the particular calculation formula is as follows.

$$\theta_{\Delta f}(6) = \alpha \cdot 6^2 + \beta \cdot 6 + 1 \tag{17}$$

$$\theta_{\Delta f}(8) = \alpha \cdot 8^2 + \beta \cdot 8 + 1 \tag{18}$$

$$\theta_{\Delta f}(10) = \alpha \cdot 10^2 + \oplus \cdot 10 + 1 \tag{19}$$

Wherein, coefficients $\alpha$ and $\beta$ are binomial coefficients, and may be calculated according to $\theta_{\Delta f}(2)$ and $\theta_{\Delta f}(4)$ already obtained by statistics. The specific formulas are as follows:

$$\alpha = \frac{(2 \cdot \theta_{\Delta f}(4) - 4 \cdot \theta_{\Delta f}(2)) - (2-4)}{2 \cdot 4^2 - 4 \cdot 2^2} \tag{20}$$

$$\beta = \frac{\theta_{\Delta f}(4) - 1 - 4^2 \cdot \left( \frac{(2 \cdot \theta_{\Delta f}(4) - 4 \cdot \theta_{\Delta f}(2)) - (2-4)}{2 \cdot 4^2 - 4 \cdot 2^2} \right)}{4} \tag{21}$$

The embodiment of the invention has been described with respect to the case where the receiving resources are limited to one RB in the TD-LTE system as an example, but the embodiment of the invention is not limited thereto. For example, the embodiment of the invention may also be applied to such cases as those where receiving resources are limited to two RB in the TD-LTE system, or where other pilot resources are limited in the TD-LTE system, or the pilot resources are limited in other systems. The embodiment of the invention may also be applied to a case where the pilot resources are not limited.

Figure 2:
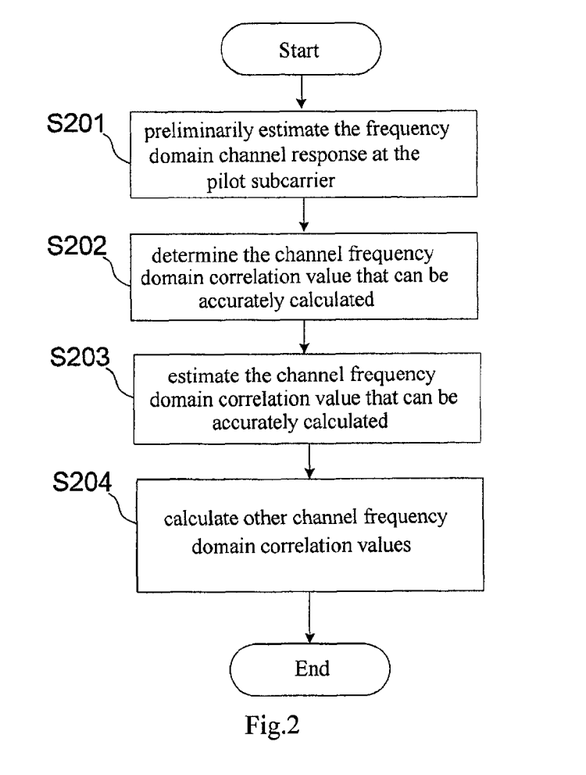
FIG. 2 illustrates a flow chart of a method of calculating channel frequency domain correlation according to an embodiment of the invention.

FIG. 2 illustrates a flow chart of the method of calculating channel frequency domain correlation according to the embodiment of the invention. In step S201, a frequency domain channel response at the pilot subcarrier of the receiving signal is preliminarily estimated to obtain a pilot channel preliminary estimation value. In step S202, a channel frequency domain correlation value which can be reliably calculated is determined. In step S203, the channel frequency domain correlation value which can be reliably calculated is calculated using a pilot channel preliminary estimation value to obtain a reliably calculated channel frequency domain correlation value. In step S204, other channel frequency domain correlation values are calculated using the reliably calculated channel frequency domain correlation value.

In one example, step S201 may include LS channel estimating the frequency domain channel response at the pilot subcarrier.

In one example, step S202 may include determining a number of sample which can be used for calculating channel frequency domain correlation value according a distribution of the pilot subcarrier, and determining the channel frequency domain correlation value which can be reliably calculated based on the number of sample.

In one example, step S203 may include computing the channel frequency domain correlation value which can be reliably calculated according to the following formula:

$$\theta_{\Delta f}(q) = \underset{\{(k_1,l_1),(k_2,l_2)\}\in P_q}{E}\left\{\frac{H_{k_1,l_1}^{LS}\cdot(H_{k_2,l_2}^{LS})^*}{\theta_{\Delta t}(l_2-l_1)}\right\} \tag{22}$$

Wherein, $\theta_{\Delta f}$ is the reliably calculated channel frequency domain correlation value, $q$, $k_1$, $k_2$, $l_1$, $l_2$, are integrals, the set $P_q$ is a set consisting of all subscript pair $\{(k_1,l_1), (k_2,l_2)\}$ satisfying $k_2-k_1=q$, $H_{k_1,l_1}^{LS}$ is the pilot channel preliminary estimation value of the $k_1$th subcarrier in the $l_1$th orthogonal frequency division multiplex symbol as a pilot subcarrier, $H_{k_2,l_2}^{LS}$ is the pilot channel preliminary estimation value of the $k_2$th subcarrier in the $l_2$th orthogonal frequency division multiplex symbol as a pilot subcarrier, $\theta_{\Delta t}(l_2-l_1)$ is a time domain correlation value.

In one example, step S204 may include performing interpolation upon the reliably calculated channel frequency domain correlation value to calculate other channel frequency domain correlation values. For example, a polynomial interpolation and an exponential interpolation may be performed to the reliably calculated channel frequency domain correlation value.

In specific implementation of the method of calculating channel frequency domain correlation according to the embodiment of the invention, a structure of the channel frequency domain correlation calculation according to the invention and functions of respective units described above may be referred to. For simplicity of the description, the specific implementation for each step above will not be described in detail.

Figure 3:
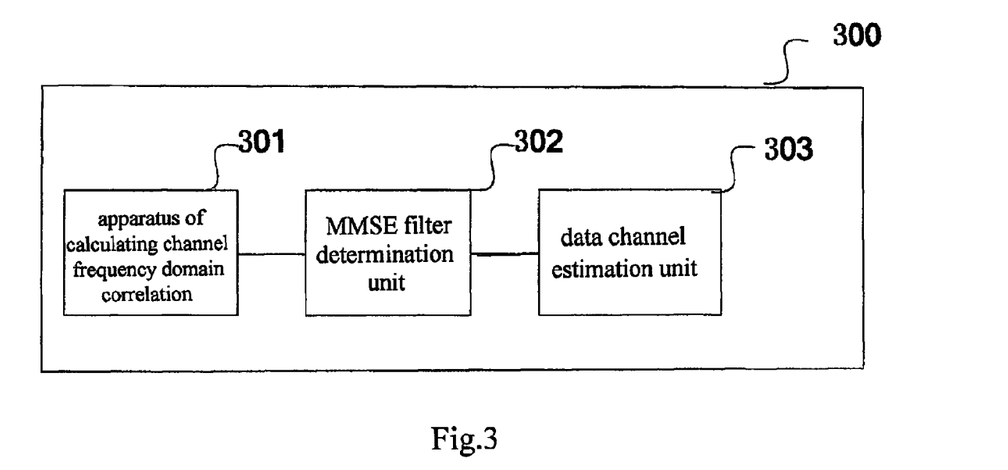
FIG. 3 illustrates a block diagram of a channel estimation apparatus according to an embodiment of the invention.

FIG. 3 illustrates a block diagram of the channel estimation apparatus 300 according to the embodiment of the invention. The channel estimation apparatus 300 includes a apparatus of calculating channel frequency domain correlation 301, which may be the apparatus of calculating channel frequency domain correlation according to the embodiment of the invention described above; an MMSE filter determination unit 302, configured to calculate and obtain an MMSE filter coefficient based on the channel frequency domain correlation value calculated by the apparatus of calculating channel frequency domain correlation, to determine an MMSE filter; a data channel estimation unit 303, configured to estimate a frequency domain channel response at a data subcarrier of a receiving signal based on the MMSE filter.

The MMSE filter determination unit 302, for example, calculates cross-correlation vector $\theta$ and self-correlation matrix $\Phi$ according to formula (10) and formula (11) by using the channel frequency domain correlation value obtained by the apparatus of calculating channel frequency domain correlation 301, and then calculates the MMSE filter coefficient according to formula (5). The realization of the MMSE filter determination unit 302 is within the purview of those skilled in the art, and will not be described in detail herein.

In one example, the MMSE filter determination unit 302 directly calculates the coefficient for the data MMSE filter algorithm. The data channel estimation unit 303 filters the pilot channel preliminary estimation value obtained by the apparatus of calculating channel frequency domain correlation 301 by directly using the filter obtained by the MMSE filter determination unit 302 to obtain data channel estimation.

Figure 4:
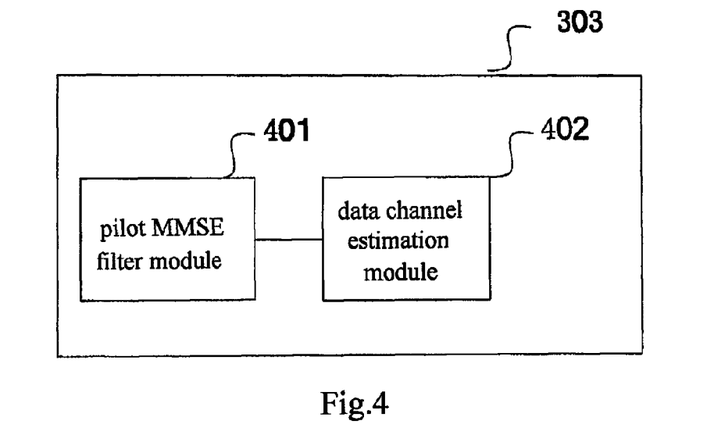
FIG. 4 illustrates a block diagram of a data channel estimation unit in a channel estimation apparatus according to an embodiment of the invention.

In one example, the MMSE filter determination unit 302 calculates the coefficient for the pilot MMSE filter algorithm. As shown in FIG. 4, the data channel estimation unit 303 includes a pilot MMSE filter module 401, configured to perform an MMSE filter to the pilot channel preliminary estimation value by using the MMSE filter to obtain the pilot channel estimation value; and a data channel estimation module 402, configured to obtain the data channel estimation value by using the pilot channel estimation value. The pilot MMSE filter module 401 performs filtering to the pilot channel preliminary estimation value, which may enhance the reliability of the estimation of the frequency domain channel response at these pilot subcarriers. The data channel estimation module 402, for example, may obtain the data channel estimation value by simply performing interpolation respectively in time and frequency domains upon the pilot channel estimation value. Of course, the embodiment of the invention is limited thereto, and such methods as second interpolation, MMSE filtering, low-pass filtering and Spline interpolation may also be adopted.

In the embodiment of the invention, the apparatus of calculating channel frequency domain correlation 301 and MMSE filter determination unit 302 both involves the moving speed of the receiving end relative to the transmitting end. Therefore, in one example, the apparatus of calculating channel frequency domain correlation 301 and MMSE filter determination unit 302 may share one module for estimation of the moving speed. The module may be incorporated in the apparatus of calculating channel frequency domain correlation 301 or MMSE filter determination unit 302, or exist outside both of them.

Figure 5:
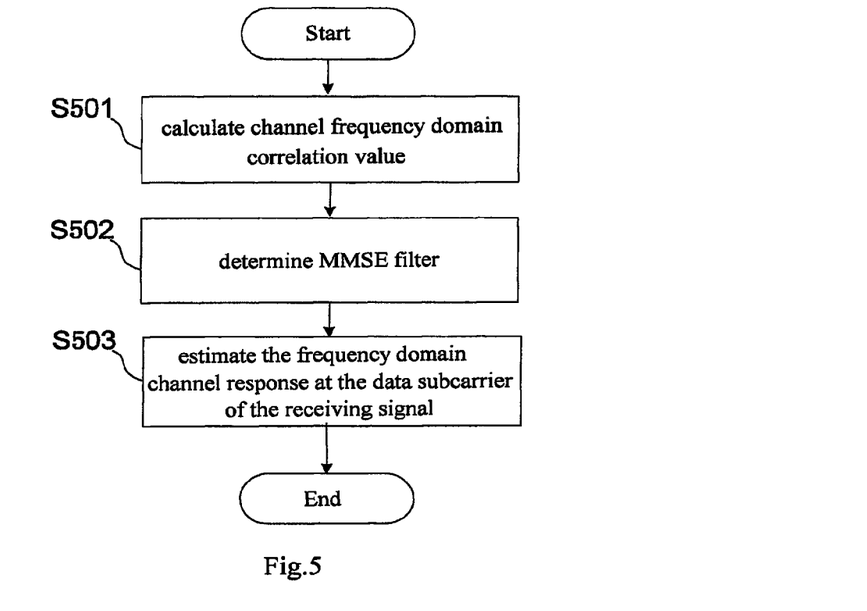
FIG. 5 illustrates a flow chart of a channel estimation method according to an embodiment of the invention.

FIG. 5 illustrates a flow chart of the channel estimation method according to the embodiment of the invention. In step S501, the channel frequency domain correlation is calculated by using the method of calculating channel frequency domain correlation according to the embodiment of the invention shown in FIG. 2. In step S502, an MMSE filter coefficient is obtained by calculation using the channel frequency domain correlation value, to determine the MMSE filter. In step S503, the frequency domain channel response at the data subcarrier of the receiving signal is estimated based on the MMSE filter.

In specific implementation for the channel estimation method according to the embodiment of the invention, the structure of the channel estimation apparatus according to the invention and the function of various units described above may be referred to. For simplicity of the description, specific implementation of each step above will not be described in detail herein.

Although the present invention and its advantage have been described in detail, it should be understood that various changes, substitutes and modifications may occur without departing from the spirit and scope of the invention defined by the accompanying claims.

Furthermore, the method and apparatus according to the invention may be realized through hardware, and also may be realized through software or firmware. In a case of being realized through software or firmware, a program constituting the software is installed into a computer with specialized hardware structure, such as general-purpose computer 700 shown in FIG. 7 from a storage medium or network. The computer with various programs installed may perform various function, etc.

Figure 7:
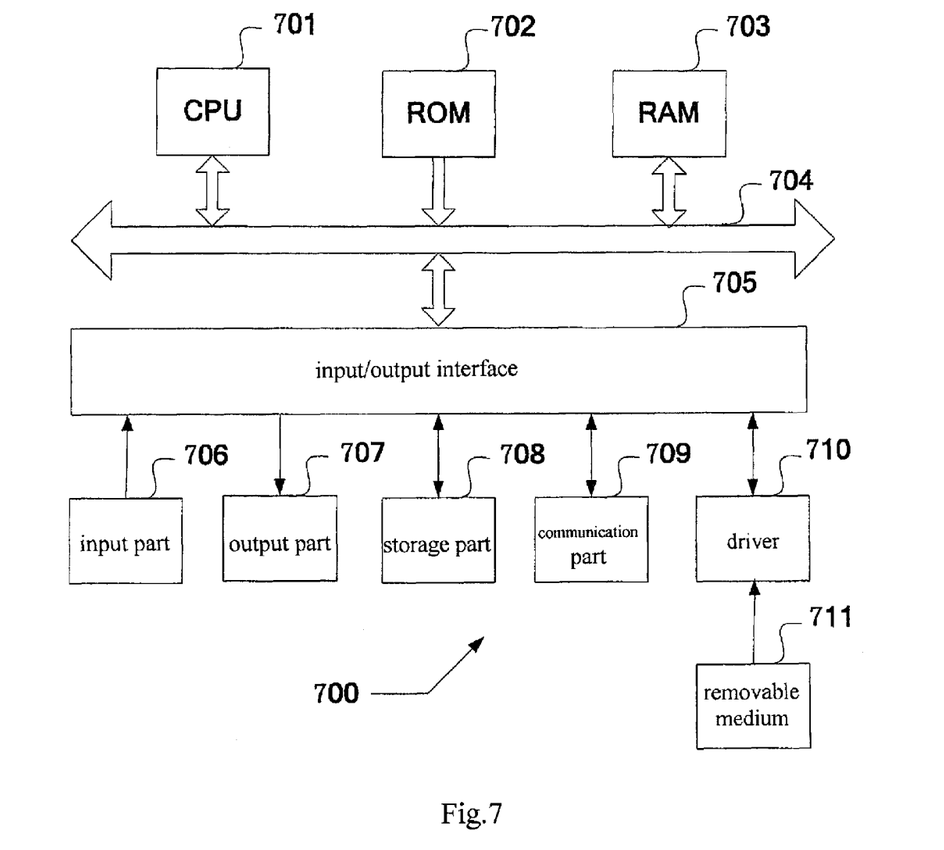
FIG. 7 illustrates a block diagram of an illustrative structure of the computer that may be used for implementing the embodiment of the invention.

In FIG. 7, a central processing unit (CPU) 701 executes various processes according to a program stored in a read-only memory (ROM) 702 or a program loaded to a random access memory (RAM) 703 from a storage part 708. In RAM 703, a data required upon executing various processes by CPU 701 and so on is also stored as needed. CPU 701, ROM 702 and RAM 703 connect with each other via bus 704. Input/output interface 705 also connects to bus 704. The following parts connects to input/output interface 705: an input part 706, including keyboard, mouse, etc.; an output part 707, including display, such as Cathode Ray Tube (CRT), Liquid Crystal Display (LCD), etc., and loudspeaker, etc.; a storage part 708, including hardware, etc.; and a communication part 709, including network interface card such as LAN card, modem, etc. The communication part 709 executes a communication process via the network such as internet.

As needed, a driver 710 also connects to input/output interface 705. A removable medium 711 such as magnetic disk, optical disk, magneto optical disk, semi-conductor storage and so on is installed on the driver 710 as needed, so that the computer program read from it is installed into the storage part 708 as needed.

In a case where the above series of processes is implemented through software, the program constituting the software is installed from the network such as internet or a storage medium such as removable medium 711.

It should be understood by those skilled in the art that the storage medium is not limited to the removable medium 711 shown in FIG. 7, which stores the program therein and distributes to provide program to the user separately with the apparatus. Examples of removable medium 711 includes magnetic disk (including floppy disk (registered trademark)), optical disk (including compact disk read only memory (CD-ROM) and digital versatile disk (DVD)), magneto optical disk (including mini disk (MD) (registered trademark)) and semi-conductor storage. Or the storage medium may be ROM 702, a hardware incorporated in the storage part 708, etc., in which a program is stored and distributed to the user with the apparatus incorporating them.

As long as the system or the apparatus has the function of executing the program, the implementing method of the invention is not limited to the program, and the program may be in various forms, such as target program, a program executed by the interpreter, or a script program supplied to the operating system, etc.

In addition, the invention may also be implemented in a case where the computer connects to corresponding web on internet, and downloads and installs the computer program code according to the invention into the computer, and then executes the program.

Furthermore, the program implementing the invention may also adopt the form of one or more signals, for example. The signal may be a data signal downloaded from network, or a data signal supplied on a carrier signal, or a data signal in any other forms.

At last, it needs to be stated that in the context, the terms such as the first and the second are only used to differentiate one entity or operation from another entity or operation, and in practice do not necessarily require or imply any such relation or order between these entities or operations. Moreover, terms "include", "incorporate" or any other variants are intended to encompass non-exclusive inclusion, so that the process, method, objects or apparatus including a series of elements includes not only those elements, but also other elements not expressly listed, or elements inherent to the process, method, object or apparatus. In a case without further constraints, an element defined by sentence "include one" does not exclude the possibility that other same element exists in the process, method, object or apparatus including the element.

While the embodiment of the invention is described in detail with reference to accompanying drawings in the above, it should be understood that the above described embodiments are only for illustration of the invention, and do not constitute a restriction on the invention. For those skilled in the art, various modifications and alterations to the above embodiments may be made without departing from spirit and scope of the invention. Therefore, the scope of the invention is defined only by the accompanying claims and it equivalents.

Notes

Note 1: An apparatus of calculating channel frequency domain correlation, including:

a pilot channel preliminary estimation unit configured to preliminarily estimate a frequency domain channel response at pilot subcarriers of a receiving signal to obtain a pilot channel preliminary estimation value;

a determination unit configured to determine a channel frequency domain correlation value which can be reliably calculated;

a first channel frequency domain correlation value calculation unit configured to calculate the channel frequency domain correlation value which can be reliably calculated using the pilot channel preliminary estimation value to obtain a reliably calculated channel frequency domain correlation value; and a second channel frequency domain correlation value calculation unit configured to calculate an other channel frequency domain correlation values using the reliably calculated channel frequency domain correlation value.

Note 2. The apparatus of calculating channel frequency domain correlation according to Note 1, wherein the pilot channel preliminary estimation unit is configured to conduct least square channel estimation for the frequency domain channel response at the pilot subcarriers.

Note 3. The apparatus of calculating channel frequency domain correlation according to Note 1, wherein the determination unit is configured to determine a number of sample which can be used for calculating a channel frequency domain correlation value based on distribution of the pilot subcarriers, and to determine the channel frequency domain correlation value which can be reliably calculated based on the number of the sample.

Note 4. The apparatus of calculating channel frequency domain correlation according to Note 1, wherein the first channel frequency domain correlation value calculation unit is configured to calculate the channel frequency domain correlation value which can be reliably calculated according to the following formula:

$$\theta_{\Delta f}(q) = \underset{\{(k_1,l_1),(k_2,l_2)\} \in P_q}{E} \left\{ \frac{H_{k_1,l_1}^{LS} \cdot (H_{k_2,l_2}^{LS})^*}{\theta_{\Delta t}(l_2 - l_1)} \right\}$$

wherein, $\theta_{\Delta f}$ indicates the channel frequency domain correlation value which can be reliably calculated, q, $k_1$, $k_2$, $l_1$ and $l_2$ are integers, $P_q$ is a set composed of all of pairs of subscript $\{(k_1,l_1), (l_2,l_2)\}$ meeting $k_2-k_1=q$, $H_{k_1,l_1}^{LS}$ is a pilot channel preliminary estimation value of the $k_1$th subcarrier in the $l_1$th OFDM symbol as a pilot subcarrier, $H_{k_2,l_2}^{LS}$ is a pilot channel preliminary estimation value of the $k_2$th subcarrier in the $l_2$th OFDM symbol as a pilot subcarrier, and $\theta_{\Delta t}(l_2-l_1)$ is a time domain correlation value.

Note 5. The apparatus of calculating channel frequency domain correlation according to Note 1, wherein the second channel frequency domain correlation value calculation unit is configured to perform interpolation upon the reliably calculated channel frequency domain correlation values to calculate the other channel frequency domain correlation value.

Note 6. The apparatus of calculating channel frequency domain correlation according to Note 5, the second channel frequency domain correlation value calculation unit is configured to perform a polynomial interpolation or exponential interpolation upon the reliably calculated channel frequency domain correlation value.

Note 7. A method of calculating channel frequency domain correlation, including the steps of:
estimating preliminarily a frequency domain channel response at pilot subcarriers of a receiving signal to obtain a pilot channel preliminary estimation value;
determining a channel frequency domain correlation value which can be reliably calculated;
calculating the channel frequency domain correlation value which can be reliably calculated using the pilot channel preliminary estimation value to obtain a reliably calculated channel frequency domain correlation value; and
calculating the other channel frequency domain correlation value using the reliably calculated channel frequency domain correlation value.

Note 8. The method of calculating channel frequency domain correlation according to Note 7, wherein the step of estimating preliminarily a frequency domain channel response at pilot subcarriers includes the step of conducting least square channel estimation for the frequency domain channel response at the pilot subcarriers.

Note 9. The method of calculating channel frequency domain correlation according to Note 7, wherein the step of determining channel frequency domain correlation value which can be reliably calculated includes the steps of determining a number of sample which can be used for calculating a channel frequency domain correlation value based on distribution of the pilot subcarriers, and determining channel frequency domain correlation value which can be reliably calculated based on the number of the sample.

Note 10. The method of calculating channel frequency domain correlation according to Note 7, wherein the step of calculating the channel frequency domain correlation value which can be reliably calculated using the pilot channel preliminary estimation value includes the step of calculating the channel frequency domain correlation value which can be reliably calculated according to the following formula:

$$\theta_{\Delta f}(q) = \underset{\{(k_1,l_1),(k_2,l_2)\} \in P_q}{E} \left\{ \frac{H_{k_1,l_1}^{LS} \cdot (H_{k_2,l_2}^{LS})^*}{\theta_{\Delta t}(l_2 - l_1)} \right\}$$

wherein, $\theta_{\Delta f}$ indicates the channel frequency domain correlation value which can be reliably calculated, $q$, $k_1$, $k_2$, $l_1$ and $l^2$ are integers, $P_q$ is a set composed of all of pairs of subscript $\{(k_1,l_1), (k_2,l_2)\}$ meeting $k_2-k_1=q$, $H_{k_1,l_1}^{LS}$ is a pilot channel preliminary estimation value of the $k_1$th subcarrier in the $l_1$th OFDM symbol as a pilot subcarrier, $H_{k_2,l_2}^{LS}$ is a pilot channel preliminary estimation value of the $k_2$th subcarrier in the $l_2$th OFDM symbol as a pilot subcarrier, and $\theta_{\Delta t}(l_2-l_1)$ is a time domain correlation value.

Note 11. The method of calculating channel frequency domain correlation according to Note 7, wherein the step of calculating the other channel frequency domain correlation value using the reliably calculated channel frequency domain correlation value includes the step of performing interpolation upon the reliably calculated channel frequency domain correlation values to calculate the other channel frequency domain correlation value.

Note 12. The method of calculating channel frequency domain correlation according to Note 11, wherein the step of performing interpolation upon the reliably calculated channel frequency domain correlation values includes the step of conducting a polynomial interpolation or exponential interpolation upon the reliably calculated channel frequency domain correlation value.

Note 13. A channel estimation apparatus, including:
the apparatus of calculating channel frequency domain correlation according to one of notes 1-6;
a Minimum Mean Square Error determination unit, configured to obtain a minimum mean square error filter coefficient by calculation based on the channel frequency domain correlation value calculated by the apparatus of calculating channel frequency domain correlation, to determine a minimum mean square error filter;
a data channel estimation unit, configured to estimate the frequency domain channel response at the data subcarrier of the receiving signal based on the minimum mean square error filter.

Note 14. The channel estimation apparatus according to Note 13, wherein the data channel estimation unit includes:
a pilot minimum mean square error filter module, configured to conduct a minimum mean square error filter to the pilot channel preliminary estimation value by using the minimum mean square error filter, to obtain a pilot channel estimation value; and
a data channel estimation module, configured to obtain a data channel estimation value by using the pilot channel estimation value.

The invention claimed is:

1. An apparatus for calculating channel frequency domain correlation so as to calculate a minimum mean square error filter coefficient, comprising:
a pilot channel preliminary estimation unit configured to preliminarily estimate a frequency domain channel response at pilot subcarriers of a receiving signal to obtain a pilot channel preliminary estimation value;
a determination unit configured to determine, from channel frequency domain correlation values which can be estimated directly, a channel frequency domain correlation value which can be reliably calculate, and consider any of the remaining channel frequency domain correlation values which can be estimated directly and a channel frequency domain correlation value which cannot be estimated directly as a channel frequency domain correlation value which cannot be reliably calculated;
a first channel frequency domain correlation value calculation unit configured to calculate the channel frequency domain correlation value which can be reliably calculated using the pilot channel preliminary estimation value to obtain a reliably calculated channel frequency domain correlation value;
wherein the first channel frequency domain correlation value calculation unit is configured to calculate the channel frequency domain correlation value which can be reliably calculated according to the following formula:

$$\theta_{\Delta f}(q) = \underset{\{(k_1,l_1),(k_2,l_2)\} \in P_q}{E} \left\{ \frac{H_{k_1,l_1}^{LS} \cdot \left(H_{k_2,l_2}^{LS}\right)^*}{\theta_{\Delta t}(l_2 - l_1)} \right\}$$

wherein, $\theta_{\Delta f}$ indicates the channel frequency domain correlation value which can be realiably calculated, q, $k_1$, $k_2$, $l_1$ and $l_2$ are integers, $P_q$ is a set composed of all of pairs of subscript $\{(k_1 l_1)\}$ meeting $k_2-k_1=q$, $H_{k_1,l_1}^{LS}$ is a pilot channle preliminary estimation value of the $k_1$th subcarrier in the $l_2$th OFDM symbol as a pilot subcarrier, $H_{k_2,l_2}^{LS}$ is a pilot channel preliminary estimation value of the $k_2$th subcarrier in the $l_2$th OFDM symbol as a pilot subcarrier, and $\theta_{\Delta t}(l_2-l_1)$ is a time domain correlation value; and a second channel frequency domain correlation value calculation unit configured to calculate the channel frequency domain correlation value which cannot be reliably calculated, using the reliably calculated channel frequency domain correlation value.

2. The apparatus for calculating channel frequency domain correlation according to claim 1, wherein the pilot channel preliminary estimation unit is configured to conduct least square channel estimation for the frequency domain channel response at the pilot subcarriers.

3. The apparatus for calculating channel frequency domain correlation according to claim 1, wherein the determination unit is configured to determine a number of sample which can be used for calculating a channel frequency domain correlation value based on distribution of the pilot subcarriers, and to determine the channel frequency domain correlation value which can be reliably calculated based on the number of the sample.

4. The apparatus for calculating channel frequency domain correlation according to claim 1, wherein the second channel frequency domain correlation value calculation unit is configured to perform interpolation upon the reliably calculated channel frequency domain correlation values to calculate the other channel frequency domain correlation value.

5. The apparatus for calculating channel frequency domain correlation according to claim 4, the second channel frequency domain correlation value calculation unit is configured to perform a polynomial interpolation or exponential interpolation upon the reliably calculated channel frequency domain correlation value.

6. A channel estimation apparatus, including:
the apparatus for calculating channel frequency domain correlation according to claim 1;
a Minimum Mean Square Error determination unit, configured to obtain a minimum mean square error filter coefficient by calculation based on the channel frequency domain correlation value calculated by the apparatus for calculating channel frequency domain correlation, to determine a minimum mean square error filter;
a data channel estimation unit, configured to estimate the frequency domain channel response at the data subcarrier of the receiving signal based on the minimum mean square error filter.

7. The channel estimation apparatus according to claim 6, wherein the data channel estimation unit includes:
a pilot minimum mean square error filter module, configured to conduct a minimum mean square error filter to the pilot channel preliminary estimation value by using the minimum mean square error filter, to obtain a pilot channel estimation value; and a data channel estimation module, configured to obtain a data channel estimation value by using the pilot channel estimation value.

8. A method for calculating channel frequency domain correlation so as to calculate a minimum mean square error filter coefficient, comprising:
estimating preliminarily a frequency domain channel response at pilot subcarriers of a receiving signal to obtain a pilot channel preliminary estimation value;
determining, from channel frequency domain correlation values which can be estimated directly, a channel frequency domain correlation value which can be reliably calculated, and considering any of the remaining channel frequency domain correlation values which can be estimated directly and a channel frequency domain correlation value which cannot be estimated directly as a channel frequency domain correlation value which cannot be reliably calculated;
calculating the channel frequency domain correlation value which can be reliably calculated using the pilot channel preliminary estimation value to obtain a reliably calculated channel frequency domain correlation value;
wherein the calculating the channel frequency domain correlation value which can be reliably calculated using the pilot channel preliminary estimation value includes calculating the channel frequency domain correlation value which can be reliably calculated according to the following formula:

$$\theta_{\Delta f}(q) = \underset{\{(k_1,l_1),(k_2,l_2)\} \in P_q}{E} \left\{ \frac{H_{k_1,l_1}^{LS} \cdot \left(H_{k_2,l_2}^{LS}\right)^*}{\theta_{\Delta t}(l_2 - l_1)} \right\}$$

wherein, $\theta_{\Delta f}$ indicates the channel frequency domain correlation value which can be reliably calculated, q, $k_1$, $k_2$, $l_1$ and $l_2$ are integers, $P_q$ is a set composed of all of pairs of subscript $\{(k_1 l_1)\}$ meeting $k_2-k_1=q$, $H_{k_1,l_1}^{LS}$ is a pilot channle preliminary estimation value of the $k_1$th subcarrier in the $l_2$th OFDM symbol as a pilot subcarrier, $H_{k_2,l_2}^{LS}$ is a pilot channel preliminary estimation value of the $k_2$th subcarrier in the $l_2$th OFDM symbol as a pilot subcarrier, and $\theta_{\Delta t}(l_2-l_1)$ is a time domain correlation value; and and calculating the channel frequency domain correlation value which cannot be reliably calculated, using the reliably calculated channel frequency domain correlation value.

9. The method for calculating channel frequency domain correlation according to claim 8, wherein the estimating preliminarily a frequency domain channel response at pilot subcarriers includes conducting least square channel estimation for the frequency domain channel response at the pilot subcarriers.

10. The method for calculating channel frequency domain correlation according to claim 8, wherein the determining channel frequency domain correlation value which can be reliably calculated includes determining a number of sample which can be used for calculating a channel frequency domain correlation value based on distribution of the pilot subcarriers, and determining channel frequency domain correlation value which can be reliably calculated based on the number of the sample.

11. The method for calculating channel frequency domain correlation according to claim 7, wherein the calculating the channel frequency domain correlation value which cannot be reliably calculated using the reliably calculated channel frequency domain correlation value includes performing interpolation upon the reliably calculated channel frequency domain correlation values to calculate the channel frequency domain correlation value which cannot be reliably calculated.

12. The method for calculating channel frequency domain correlation according to claim 11, wherein the performing interpolation upon the reliably calculated channel frequency domain correlation values includes conducting a polynomial interpolation or exponential interpolation upon the reliably calculated channel frequency domain correlation value.

* * * * *